May 27, 1958 R. BECK 2,836,006
HOUSING FOR ANIMAL TRAPS
Filed Feb. 28, 1952

Inventor:
Raymond Beck
by Charles F. Osgood,
Attorney

United States Patent Office

2,836,006
Patented May 27, 1958

2,836,006

HOUSING FOR ANIMAL TRAPS

Raymond Beck, Knox, Pa.

Application February 28, 1952, Serial No. 273,870

4 Claims. (Cl. 43—96)

This invention relates to animal traps and more particularly to a frangible housing for steel jaw type traps for preventing access of foreign matter such as dirt, leaves or snow, to the trap mechanism, and for sealing out moisture, while permitting normal functioning of the trap.

In steel jaw type animal traps, such as those for catching foxes or like animals, considerable difficulty has been encountered in keeping out dirt, leaves, or snow from the trigger mechanism, and to keep out moisture particularly during rainy and thawing weather. Also such traps are ofttimes sprung by undesirable small rodents, birds or other small game. The present invention contemplates improvements over known types of jaw traps in that the disadvantages above outlined are substantially overcome. The jaw trap of the present invention is completely covered by a frangible housing which keeps out dirt, leaves, snow or moisture while permitting the trap to function in a normal manner. The housing has its flat and level top closely overlying the trip pan of the trap and is of sufficient strength to prevent release of the trigger mechanism by undesirable small rodents and birds but is designed to abruptly shatter when stepped upon by a heavier animal such as a fox or the like. The housing top upon fracture enables movement of the foot of the animal into a position to effect release of the trigger mechanism. The housing is desirably of inverted dish-like form, and acts to seal air therein, so that water is effectively kept out, and also serves to conceal completely the set trap and to prevent the animal from smelling the trap-odor. The housing is desirably composed of molded paraffin or the like and which may be readily molded into the desired shape and at relatively small cost.

It is accordingly a primary object of the present invention to provide an improved frangible housing for an animal trap. Another object is to provide an improved trap-housing or cover which is desirably composed of a frangible material, and which is adapted to break when stepped upon by an animal of sufficient weight. Yet another object is to provide an improved trap-housing which provides a seal to keep out water as well as foreign matter such as dirt, leaves or snow. A further object is to provide an improved trap housing which is desirably composed of paraffin or the like, and which is adapted to readily fracture when stepped upon to permit normal functioning of the trap. A still further object is to provide a frangible trap housing which covers the trap completely not only to keep out undesirable foreign matter but also to conceal the same and to seal in the odor of the trap. Yet another object is to provide an improved frangible trap housing which may be formed to simulate snow or ice in winter, and sand or dirt in summer, depending upon the desired characteristics. These and other objects and advantages of the invention will however, hereinafter more fully appear.

In the accompanying drawing there are shown for purposes of illustration one form and a modification which the invention may assume in practice.

Figure 1:
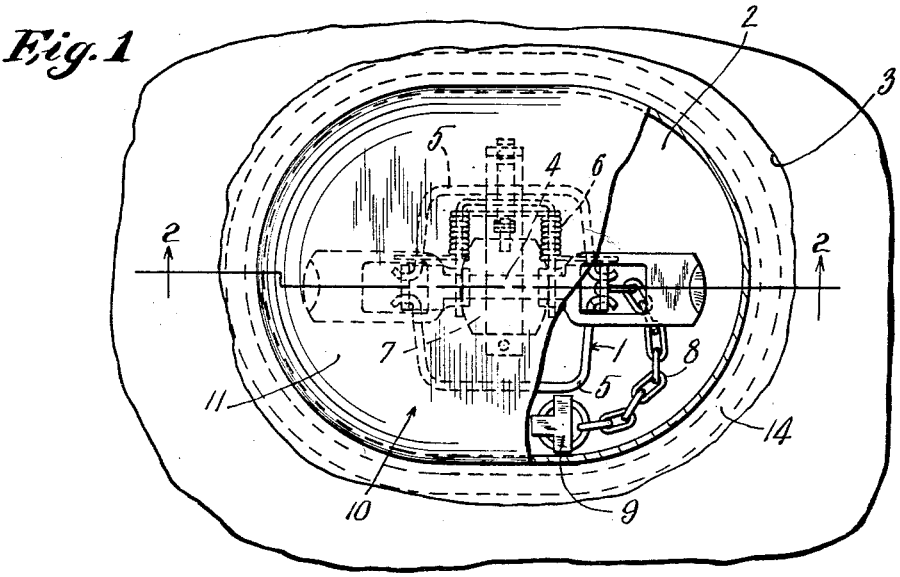
Fig. 1 is a plan view of a steel jaw trap having a preferred form of housing associated therewith, with the housing partially broken away to show the trap.
Figure 2:
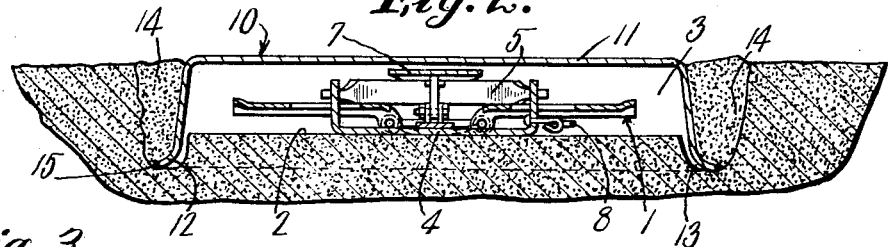
Fig. 2 is a central vertical section taken on line 2—2 of Fig. 1.

In both embodiments of this improved construction, a conventional steel jaw trap, generally designated 1, is placed at the bottom 2 of a suitable recess 3 dug in the ground. The trap comprises a base bar 4 on which jaws 5 are pivotally mounted; these jaws being urged toward closed position by usual springs 6. A trigger mechanism includes a trip pan 7 which, when the trap is set, holds the jaws in wide open position, as shown in Figs. 1 and 2. Attached to the base bar is a chain 8 which is anchored by a pin 9 to the ground within the recess.

Figure 3:
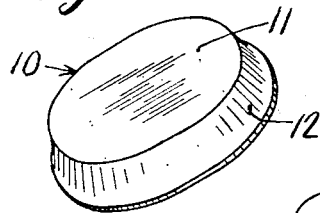
Fig. 3 is a perspective view of the improved frangible housing or cover.

The improved frangible housing or cover of the preferred embodiment is generally designated 10 and, as shown in Figs. 1 to 3 inclusive, is desirably of oval dish-like shape and is placed in inverted position within the ground-recess 3 with its horizontal plane top 11 lying substantially flush with the ground surface, as shown in Fig. 2. The bottom edge of the housing is formed with an outwardly flared lower edge 12. The lower edge of the housing is placed in a groove 13 dug in the ground completely around and below the recess bottom on which the trap is supported. When the housing is placed in position over the trap, loose dirt is placed at 14 around the sides of the housing at the recess side walls, as shown in Fig. 2. The housing or cover is preferably composed of paraffin or the like, which may be readily molded into shape and which is frangible and opaque.

The inverted dish-like housing provides a seal at 15 around its lower edge at the recess bottom, as shown in Fig. 2, to keep out water, and to seal out trap odors, and the housing by completely overlying the trap keeps out snow, leaves or other foreign matter which might hinder and prevent proper functioning of the trigger mechanism of the trap.

Figure 4:
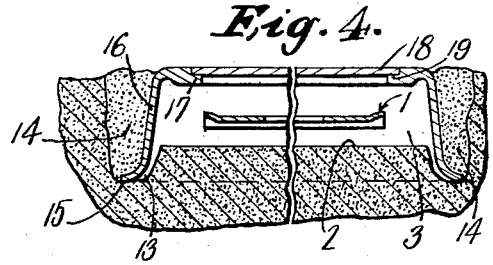
Fig. 4 is a vertical section taken through a housing or cover of modified construction.
Figure 5:
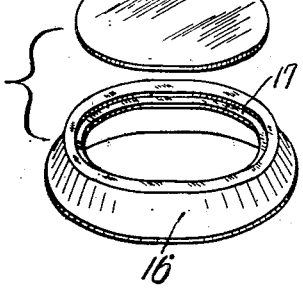
Fig. 5 is a perspective view of the modified housing shown in Fig. 4, with the frangible top disk or cover removed from the housing rim.

In the modified construction shown in Figs. 4 and 5 instead of forming the entire housing of paraffin a metallic or rigid plastic rim 16 has an inwardly bent top flange 17 which provides a top recess for receiving a flat top plate or disk 18 of paraffin or the like. The provision of the separate, reusable rim of the housing reduces the cost of replacement since it is only the flat top disk which breaks when the weight of the animal is placed thereon. A moisture seal is provided between the top disk 18 and the rim 16, at 19.

When the housing is positioned, as shown in Figs. 1 and 2, with its top flush with the ground, the trap is completely concealed therein. If small game or rodents such as squirrels or small birds should walk over the housing it has sufficient strength so that it will not break but in the event a heavier animal such as a fox should step on the housing the latter will quickly break permitting the animal's foot to move into contact with the trip pan to effect normal release of the trap jaws.

The paraffin cover may be colored if desired to blend harmoniously with the natural surroundings, and to obtain certain desired characteristics it may be sprinkled with sand or dirt during the molding process. For example in winter the housing of natural paraffin may resemble ice or snow while in summer it may be sprinkled with sand or dirt or may be colored to blend with the natural surroundings of the ground on which it is placed.

As a result of this invention an improved trap housing is provided which keeps out dirt, leaves, snow or water from the trigger mechanism of the trap. By the provision of a housing which is readily frangible the trap may function in a normal manner when stepped on with sufficient pressure yet is of sufficient strength to keep out undesirable rodents and small birds. The inverted dish-like shape of the housing provides a dome-like closure which serves as an effective air trap and water seal, and also serves to seal in trap odors. The housing is simple in design, may be made at relatively small cost and may be readily replaced. Other advantages will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. The combination with an animal trap of the steel jaw type having a trip pan and adapted to be set on a ground surface, of a rigid and self-supporting frangible enclosure for completely housing the sides and top of said trap comprising an inverted, shallow, dish-like receptacle having the bottom edge of its peripheral flange resting on the ground surface beyond the sides of the trap, said receptacle having a relatively thin and brittle, frangible horizontal top closely overlying the trip pan of the trap and abruptly shattering when stepped on by an animal with sufficient pressure to permit sudden engagement of the animal's foot with the trip pan.

2. A combination as set forth in claim 1 wherein said frangible receptacle is composed of a material impermeable by water and moisture and has its bottom-flange-edge in sealing contact with the ground surface laterally of the trap and completely thereabout to provide an air tight space in which the trap is disposed thereby to keep out water or damaging moisture from the trap.

3. A combination as set forth in claim 1 wherein said frangible receptacle is composed of paraffin or similar relatively brittle frangible material so that the receptacle will abruptly shatter when stepped on with sufficient pressure as aforesaid.

4. A frangible cover for an animal trap of the steel jaw type anchored to and resting on the ground and having a trip pan, said cover comprising a rigid, self-supporting, inverted, shallow, dish-like receptacle of relatively thin and brittle, frangible material completely enclosing the sides and top of the trap, said receptacle having its horizontal top surface closely overlying the trip pan of the trap and its flangelike sides resting on the ground laterally of the trap completely about the latter, said receptacle abruptly shattering when subjected to pressure applied thereto by an animal's foot to permit sudden contact of the foot with the trip pan.

References Cited in the file of this patent

UNITED STATES PATENTS

| 1,231,406 | Merritt | June 26, 1917 |
| 1,343,724 | Hulbert | June 15, 1920 |
| 1,469,067 | Coates | Sept. 25, 1923 |
| 1,543,030 | Rhude | June 23, 1925 |
| 1,851,331 | Schindler | Mar. 29, 1932 |
| 1,910,501 | Schindler | May 23, 1933 |
| 1,997,932 | Houts | Apr. 16, 1935 |
| 2,457,501 | Shene | Dec. 28, 1948 |
| 2,564,491 | Martin | Aug. 14, 1951 |

FOREIGN PATENTS

| 133,786 | Great Britain | Oct. 20, 1919 |

OTHER REFERENCES

Complete American Trapper, by William H. Gibson, published 1876 by James Miller, New York, pages 125, 126, 127, and 128.